(12) United States Patent
Bischl et al.

(10) Patent No.: US 10,666,395 B2
(45) Date of Patent: May 26, 2020

(54) AIS DATA TRANSMISSION

(71) Applicant: Deutsches Zentrum fuer Luft- und Raumfahrt e.V., Cologne (DE)

(72) Inventors: Hermann Bischl, Aldersbach (DE); Armin Dammann, Landsberg a. Lech (DE); Simon Plass, Seefeld (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 141 days.

(21) Appl. No.: 15/764,569

(22) PCT Filed: Dec. 7, 2016

(86) PCT No.: PCT/EP2016/080104
§ 371 (c)(1),
(2) Date: Mar. 29, 2018

(87) PCT Pub. No.: WO2017/097842
PCT Pub. Date: Jun. 15, 2017

(65) Prior Publication Data
US 2018/0287740 A1 Oct. 4, 2018

(30) Foreign Application Priority Data
Dec. 10, 2015 (DE) .......... 10 2015 121 506

(51) Int. Cl.
*G06F 11/00* (2006.01)
*H04L 1/08* (2006.01)
(Continued)

(52) U.S. Cl.
CPC .......... *H04L 1/08* (2013.01); *G06F 11/10* (2013.01); *G06F 11/1004* (2013.01); *H04B 1/74* (2013.01);
(Continued)

(58) Field of Classification Search
CPC ... G06F 11/1004; G06F 11/10; G06F 11/1044
See application file for complete search history.

(56) References Cited

U.S. PATENT DOCUMENTS

| 2011/0075602 A1* | 3/2011 | Peach | G01S 1/68 370/326 |
| 2011/0304502 A1* | 12/2011 | Chen | G08G 3/02 342/352 |

(Continued)

FOREIGN PATENT DOCUMENTS

| DE | 10 2015 112 570 A1 | 2/2016 |
| EP | 2 395 680 A1 | 12/2011 |

OTHER PUBLICATIONS

Hoye et al.; "Space-based AIS for global maritime traffic monitoring"; ACTA Astronautica, vol. 62, No. 2-3, Nov. 27, 2007, pp. 240-242.

*Primary Examiner* — Charles Ehne
(74) *Attorney, Agent, or Firm* — W & C IP

(57) ABSTRACT

The invention relates to an AIS data transmission method using AIS standard-compliant AIS signals. The AIS data (5) to be transmitted is converted into AIS signals on the transmitter side and transmitted via a main channel (41). The AIS signals are received in an AIS receiver (2, 3) and converted back into received AIS data (6, 7). Error-correcting redundancy data is generated from the AIS data (5) to be transmitted or from parts of said data on the transmitter side, and the redundancy data can be used on the receiver side to correct errors of the received AIS data (6, 7). The redundancy data is converted into redundancy signals on the transmitter side and transmitted via an auxiliary channel (42) provided in addition to the main channel (41). The invention further relates to a corresponding AIS transmitter, a corresponding AIS receiver, and an AIS transceiver. The inven- (Continued)

Figure 1:
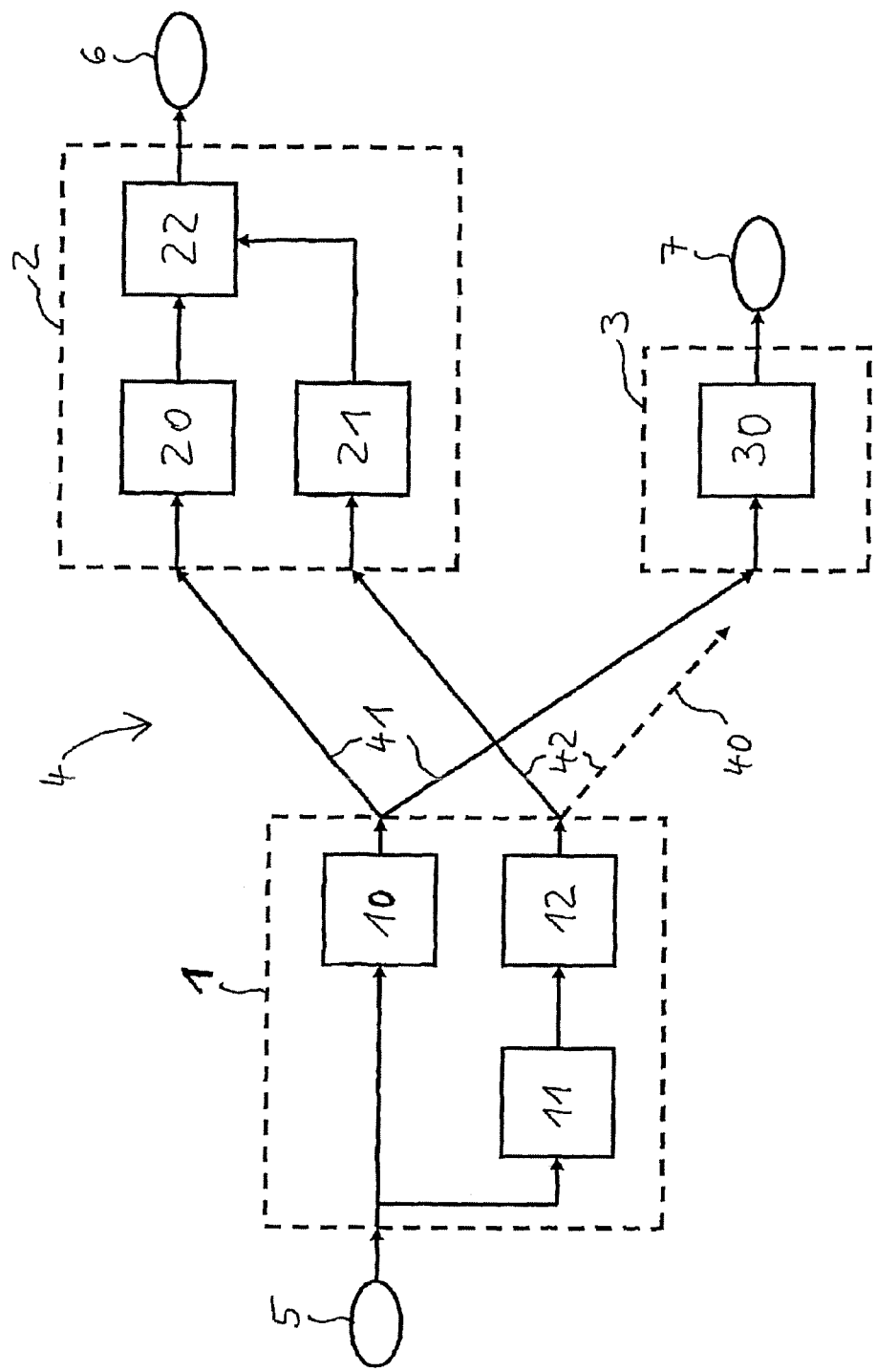

tion further relates to a system consisting of AIS transmitters and AIS receivers and to a computer program.

12 Claims, 2 Drawing Sheets

(51) Int. Cl.
*H04L 1/00* (2006.01)
*H04B 1/74* (2006.01)
*G06F 11/10* (2006.01)
*G08G 3/02* (2006.01)

(52) U.S. Cl.
CPC .......... *H04L 1/0041* (2013.01); *H04L 1/0045* (2013.01); *G08G 3/02* (2013.01); *H04L 2001/0096* (2013.01)

(56) References Cited

U.S. PATENT DOCUMENTS

| | | | | |
|---|---|---|---|---|
| 2012/0101668 A1* | 4/2012 | Ioroi | ................. | G08G 3/00 |
| | | | | 701/21 |
| 2013/0275841 A1* | 10/2013 | Prevost | ............. | H03M 13/2933 |
| | | | | 714/792 |
| 2013/0290817 A1* | 10/2013 | Prevost | ............. | H03M 13/3994 |
| | | | | 714/792 |
| 2015/0326350 A1* | 11/2015 | Macikunas | ........... | G01S 5/0027 |
| | | | | 714/776 |

* cited by examiner

AIS DATA TRANSMISSION

The invention relates to a method for AIS data transmission by means of AIS-standard-compliant AIS signals, wherein AIS data to be transmitted are converted on the transmitter side into AIS signals and are transmitted via a main channel, wherein the AIS signals are received in an AIS receiver and are converted back into received AIS data. The invention furthermore relates to a corresponding AIS transmitter, a corresponding AIS receiver, and an AIS transceiver. The invention furthermore relates to a system of AIS transmitters and AIS receivers as claimed in claim 11 and a computer program as claimed in claim 12.

AIS is the acronym for the Automatic Identification System, which is used in shipping for communication between ships and with stations on land or in the air or in space. AIS data transmission is used by ships, e.g. to avoid collisions. A global situation report of ship movements can furthermore be drawn up, wherein the AIS signals can also be received via satellite. For AIS data transmission, AIS data to be transmitted are converted on the transmitter side into AIS signals, e.g. through modulation, and the AIS signals are transmitted via a radio link. For this purpose, two channels in the VHF maritime communication band are used, i.e. AIS1=channel 87B and AIS2=channel 88B. The radio transmission range is therefore defined by the propagation conditions in the VHF frequency range.

Transmission errors can occur in AIS data transmission. A primary source of errors inherent in AIS data transmission is the overlap of AIS signals from the perspective of a receiver which is within the radio range of a plurality of AIS transmitters. These AIS transmitters frequently cannot coordinate with one another with regard to the use of the transmission channel, since they are not within radio range of one another. This results in e.g. substantial AIS signal overlaps in the reception of the AIS signals on satellites, since the latter have a large footprint (coverage area). AIS signal overlaps also occur in high-elevation earth receiving stations if the coastal areas have high-density shipping traffic. On long-distance transmission paths, e.g. to the satellite or to a high-elevation earth receiving station, significant signal degradation also occurs, which additionally increases the error rates in the transmissions.

U.S. Pat. No. 8,904,257 B2 presents proposals for the transmission of AIS data with additional error correction encoding. It is proposed there that the AIS data to be transmitted, i.e. the payload, are encoded by means of an error protection encoding and are encapsulated in a message wrapper. Consequently, the AIS signals transmitted by the AIS transmitter are no longer AIS-standard-compliant, as a result of which, in particular, these AIS signals cannot be evaluated by the multiplicity of ships which are already equipped with AIS-standard-compliant receivers. No AIS data transmission by means of AIS-standard-compliant AIS signals is therefore disclosed there.

The object of the invention is therefore to put forward proposals for an AIS data transmission by means of AIS-standard-compliant AIS signals which is more resilient to parasitic effects.

This object is achieved as claimed in claim 1 by a method for AIS data transmission by means of AIS-standard-compliant AIS signals, wherein AIS data to be transmitted are converted on the transmitter side into AIS signals and are transmitted via a main channel, wherein the AIS signals are received in an AIS receiver and are converted back into received AIS data, wherein error-correcting redundancy data which can be used on the receiver side to correct errors of the received AIS data are generated on the transmitter side from the AIS data to be transmitted or from parts of these data, and the redundancy data are converted on the transmitter side into redundancy signals and are transmitted via an auxiliary channel provided in addition to the main channel. The invention offers the advantage that the AIS data transmission can be designed with comparatively little outlay as substantially more resilient to parasitic effects, and an improved signal-to-noise ratio can thus be achieved. This applies not only to interference due to AIS signal overlaps, but also to all other types of transmission interference.

One essential advantage of the invention consists, in particular, in that the actual transmission of the AIS data and AIS signals can still be performed in an AIS-standard-compliant manner, so that all AIS receivers and AIS transceivers already in use can also receive the AIS data of an improved AIS transmitter designed according to the invention, but without using the redundancy data. However, a corresponding upgrade of AIS receivers and AIS transceivers of this type is required for the use of the redundancy data for error correction in order to receive and evaluate the redundancy signals, but this can be carried out at the respectively suitable time depending on the user, device operator or ship operator. Particularly when ships are refitted, the improved AIS receivers and AIS transceivers which can receive and evaluate the redundancy signals can be provided as equipment. The additional outlay required for this purpose is comparatively small, given that, depending on the implementation of the auxiliary channel, no hardware modifications are required, but the enhancements can be carried out instead in the form of software enhancements, or at most minor hardware modifications.

An all-hardware implementation of the auxiliary channel is advantageously also possible.

AIS-standard-compliant AIS signals are understood here to mean, in particular, AIS signals which comply with ITU Recommendation ITU-R M.1371-5 and/or its current versions.

The AIS data to be transmitted, the redundancy data and the received AIS data can be implemented totally or partially in the form of binary data (bits) and/or not yet decided soft values of such binary data which are used to decode the AIS data (in the sense of a soft decision decoding). Soft values, for example, of the received AIS data and soft values of the redundancy data can be linked on the receiver side in order to decode and provide the received AIS data.

The term "channel" used for the main channel and the auxiliary channel is to be understood here as a channel in the communications engineering sense, i.e. as any type of transmission path for wireless signal transmission. In AIS data transmission according to the AIS standard, the main channel is either the AIS1 channel or the AIS2 channel, wherein changeover between these channels takes place automatically. Any other part of the signal space which is approved for AIS signal transmission can be used as the auxiliary channel, e.g. in the AIS frequency range or in the vicinity of the AIS frequency range, e.g. in free frequency gaps. A signal space which is not provided for the transmission of AIS signals can also be used as the auxiliary channel. The auxiliary channel can be implemented e.g. by means of a signal transmission modulation type which differs from the modulation type of the main channel. An AIS-standard-compliant modulation type, e.g. any type of frequency shift keying (FSK), can be used as the modulation type for the main channel. In particular, GMSK (Gaussian Minimum Shift Keying) modulation can be used for the main channel.

As a result, only a small amount of bandwidth is required in order to transmit the AIS signals.

However, the auxiliary channel can also be implemented in ways other than by means of a different modulation type of the main channel, e.g. by means of a temporally multiplexed transmission (temporal offset between the transmission of the AIS signals and the redundancy signals), or through the use of the respective other AIS channel, i.e. either AIS1 or AIS2, depending on whether the latter is then free and is not being used for the actual transmission of the AIS signals. In particular, free timeslots in one of the AIS channels can thus be used to transmit the redundancy signals and therefore to implement the auxiliary channel.

As mentioned, the redundancy data are designed as error-correcting redundancy data which allow an error correction on the receiver side of the AIS data received there. Depending on the type and volume of the redundancy data, transmission errors can be corrected to a greater or lesser extent, i.e. complete corrections are no longer possible beyond a certain error rate. The quality of the data transmission can nevertheless be significantly improved and the data losses can be reduced by means of redundancy data of this type. In contrast to redundancy data which are designed merely as error-detecting redundancy data, such as e.g. checksums, not only an error detection, but also an error correction of at least some transmission errors directly on the receiver side are thus possible.

According to one advantageous development of the invention, it is provided that either only the AIS signals from the main channel are evaluated on the receiver side in order to form the received AIS data, or the AIS signals from the main channel are evaluated with additional evaluation of received redundancy signals in order to form the received AIS data and at least partially correct transmission errors present in the received AIS data or in parts thereof. This offers the advantage that an AIS receiver which is not yet equipped to evaluate the redundancy signals can nevertheless transmit the AIS data. An AIS receiver equipped to evaluate the AIS redundancy signals can then receive and evaluate these redundancy signals and use them to correct errors of the received AIS data or parts thereof.

According to one advantageous development of the invention, it is provided that the error-correcting redundancy data are generated through coding by means of a systematic code which allows an error correction of the data. This offers the advantage that a significant improvement can be achieved in the AIS data transmission in the event of transmission errors with little additional transmission outlay for the redundancy data. The additional bits of the generated code word which can be used for error correction are transmitted here via the auxiliary channel as redundancy data or as the aforementioned redundancy signals. The received AIS data can then be combined with the redundancy data on the receiver side and a corresponding decoding, including error correction, can be carried out. The systematic code that is used may, in particular, be an error-correcting code known from information technology, e.g. a turbo code, a convolutional code, an RS code or an LDPC code.

According to one advantageous development of the invention, it is provided that the AIS signals transmitted via the main channel are not affected by the transmission of the redundancy signals on the auxiliary channel or are affected only insofar as AIS receivers not configured to evaluate the redundancy signals can nevertheless convert the AIS signals into the AIS data. In this way, in particular, existing AIS receivers which are not equipped to evaluate the redundancy signals can continue to be used and can receive the AIS signals there and convert them into AIS data. Any slight interference with the AIS signals in the main channel due to the redundancy signals is filtered out through filter measures already provided in the AIS receiver.

According to one advantageous development of the invention, it is provided that the redundancy data allow at least an error correction of the "vessel identification" and "vessel position" AIS data. In this way, the AIS data that are particularly important for safety in shipping are more effectively protected against transmission errors. Furthermore, the AIS data to be taken into account for the error correction can be reduced to a small amount, so that the outlay for the transmission of redundancy data is relatively small and can, in particular, be reduced to a relatively small number of bits. In this way, no large transmission bandwidth is required for the implementation of the auxiliary channel.

The aforementioned object is furthermore achieved by an AIS transmitter which is configured to carry out the transmitter-side method steps of a method of the type previously explained. The advantages explained above can also be achieved herewith. The transmitter-side method steps are, in particular, the conversion of the AIS data to be transmitted into AIS signals, e.g. through modulation, and the transmission of these AIS signals via the main channel, furthermore the generation of the error-correcting redundancy data from the AIS data to be transmitted or from parts of these data, and also the conversion of the redundancy data into redundancy signals, e.g. through modulation, and the transmission of the redundancy signals via the auxiliary channel. Depending on the implementation of the auxiliary channel, these method steps can be implemented in the AIS transmitter e.g. through corresponding programming, i.e. through an enhancement or change of the AIS transmitter software.

According to one advantageous development of the invention, it is provided that the AIS transmitter has a redundancy data generator which is configured to generate the redundancy data from AIS data or from parts thereof that are fed to it, wherein a redundancy signal transmitter which is configured to convert the redundancy data into the redundancy signals and to transmit the redundancy signals via the auxiliary channel is connected downstream of the redundancy generator. The redundancy data generator can be implemented in the form of one or more circuit components (hardware), through a software enhancement or a combination thereof. The redundancy data generated by the redundancy data generator are fed to the redundancy signal transmitter.

The aforementioned object is furthermore achieved by an AIS receiver which is configured to carry out the receiver-side method steps of a method of the type previously explained. The advantages explained above can also be achieved herewith. The receiver-side method steps are, in particular, the reception of the AIS signals from the main channel and the conversion of the received AIS signals back into received AIS data, e.g. through demodulation, furthermore the reception of the redundancy signals from the auxiliary channel and the conversion of the redundancy signals into redundancy data, e.g. through demodulation, and also an error correction of the received AIS data or parts thereof using the redundancy data. Depending on the implementation of the auxiliary channel, these method steps can be implemented in the AIS receiver e.g. through corresponding programming, i.e. through an enhancement or change of the AIS receiver software.

According to one advantageous development of the invention, it is provided that the AIS receiver has a redundancy signal receiver which is configured to receive the redundancy signals and to convert these redundancy signals into redundancy data, wherein an error correction unit which is configured to carry out an error correction of the received AIS data or parts thereof using the redundancy data is connected downstream of the redundancy signal receiver. The redundancy data generated by the redundancy signal receiver are fed to the error correction unit.

The devices explained above, i.e. the AIS transmitter and the AIS receiver, may also be part of an AIS transceiver, i.e. a device which is configured both to transmit and receive AIS signals. The aforementioned object is also achieved accordingly by an AIS transceiver, having an AIS transmitter of the type previously explained and an AIS receiver of the type previously explained.

The aforementioned object is furthermore achieved by a system of AIS transmitters and AIS receivers, having:
 a) at least one AIS transmitter of the type previously explained,
 b) at least one AIS receiver of the type previously explained,
 c) at least one AIS receiver which is not configured to evaluate the AIS redundancy signals,
wherein the AIS data transmitted by the AIS transmitters can be received and evaluated not only by AIS receivers according to feature b), but also by AIS receivers according to feature c). In this way, a combined operation is possible in the system with "old" AIS receivers which are not configured to evaluate the AIS redundancy signals and AIS receivers designed according to the invention, wherein the AIS data can be exchanged in a standard-compliant manner between all participants. However, the advantages of the invention in terms of the improved resistance to interference can be implemented only the case of data transmission between AIS transmitters according to feature a) and AIS receivers according to feature b). The data transmission nevertheless remains AIS-standard-compliant and therefore downwardly compatible.

The aforementioned object is furthermore achieved by a computer program with program code means, configured to carry out the transmitter-side method steps and/or the receiver-side method steps of the method of the type previously explained, if the computer program is executed on a computer. The advantages explained above can also be achieved herewith. The computer may, for example, be a computer, e.g. a microcomputer or microprocessor, of an AIS transmitter, of an AIS receiver or of an AIS transceiver.

According to one advantageous development of the invention, the auxiliary channel can be implemented e.g. by means of one of the embodiments explained below or by a combination of a plurality of the embodiments explained below:
 1) Transmission of the redundancy signals in such a way that they lie within the frequency range outside the AIS signals or closely adjacent to the AIS signals, e.g. by means of OFDM (OFDM—Orthogonal Frequency Division Multiplexing) signals which lie closely adjacent to the AIS signals.
 2) Transmission of the redundancy signals as spread spectrum signals which can overlap the AIS signals or other signals.
 3) Transmission of the redundancy signals through amplitude modulation of the AIS signals.
 4) Transmission of the redundancy signals as additional signals in the AIS frequency range, e.g. through repetitions of the AIS signals as redundancy signals.
 5) Transmission of the redundancy signals via the respective other AIS channel which is not used to transmit the AIS signals.
 6) Transmission of the redundancy signals by means of a different modulation type which can be superposed on these AIS signals without conflicting with the modulation type used for the transmission of the AIS signals.
 7) Time division multiplex for the transmission of the redundancy signals, i.e. transmission at times when no AIS signals are being transmitted, e.g. free timeslots of the AIS data transmission.

In all cases, AIS receivers not equipped to evaluate the redundancy signals can nevertheless receive and evaluate the AIS signals, even if interference may occur, e.g. in the aforementioned embodiments 2, 4 and 5, but is registered in the AIS receiver as an increased noise level and is filtered out accordingly by the receive filter or other measures. In the case of the aforementioned embodiment 3, fluctuations in the signal strength of the AIS signals occur from the perspective of the AIS receiver, but this may also occur during normal AIS signal transmission, e.g. in the case of range fluctuations, and should not therefore result in distortions.

The invention is explained in detail below on the basis of example embodiments with the use of drawings.

Figure 2:
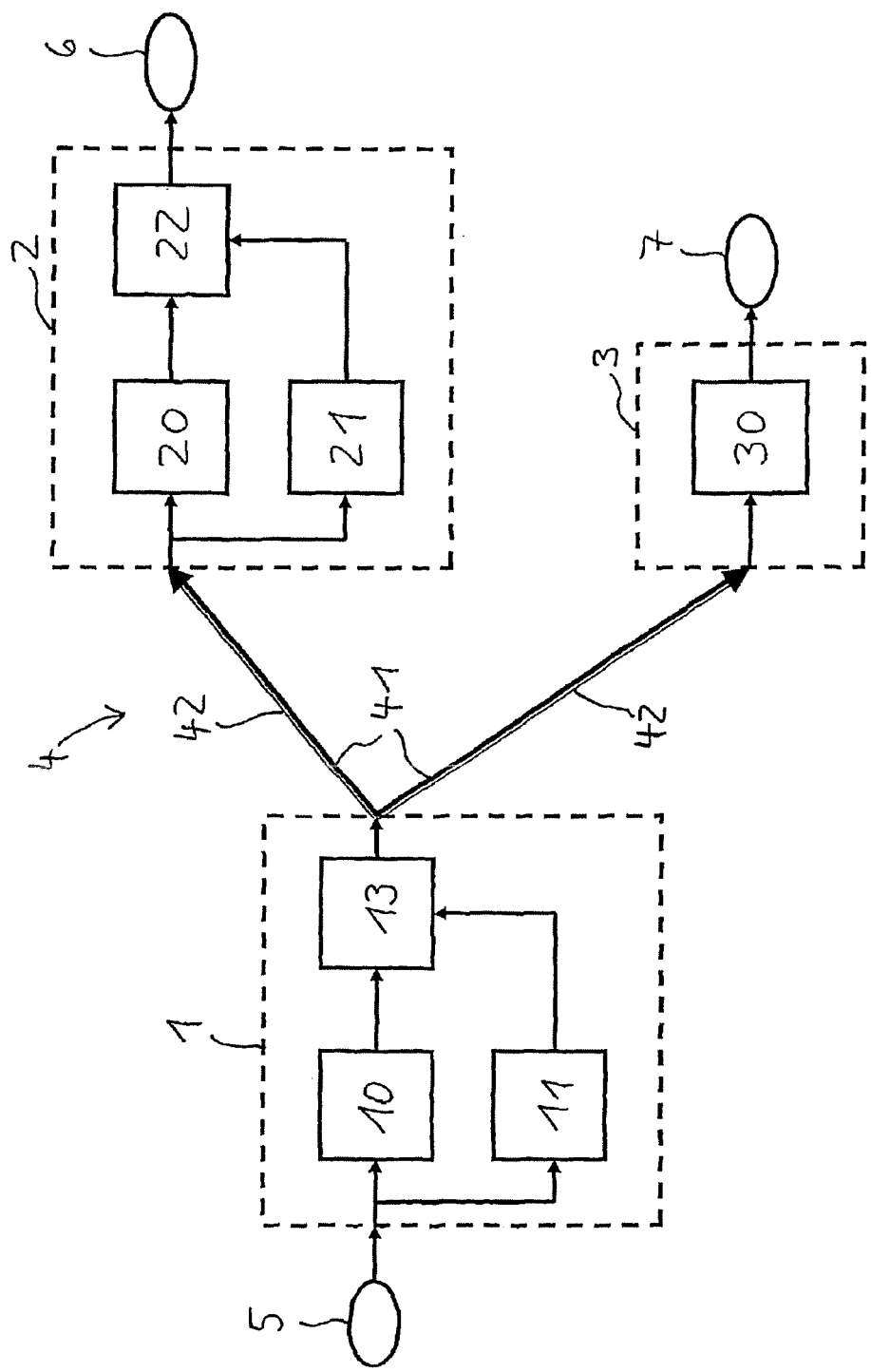

In the drawings:

FIG. 1 shows a first embodiment of a system of AIS transmitters and AIS receivers, and FIG. 2 shows a second embodiment of a system of AIS transmitters and AIS receivers.

The same reference numbers are used for matching elements in the figures.

FIG. 1 shows a schematic representation of a system which has an AIS transmitter 1 and two AIS receivers 2, 3. According to the invention, the AIS transmitter 1 is designed with the transmitter-side redundancy signal transmission. The AIS receiver 2 is similarly designed according to the invention so that it can receive and evaluate the redundancy signals of the AIS transmitter 1. The AIS receiver 3 is a standard AIS receiver which is not configured to evaluate the redundancy signals.

AIS data 5 to be transmitted are fed to the AIS transmitter 1, e.g. from sensors and/or other devices. The vessel identifier, for example, of the vessel on which the AIS transmitter is used is fed as AIS data to be transmitted, along with the position of the vessel in the form of geographical data which can be provided e.g. by a global navigation system.

The AIS data 5 to be transmitted are fed to an AIS signal generator 10 of the AIS transmitter 1. As a result, the AIS data 5 are converted into AIS signals which can then be transmitted wirelessly via the main channel 41, i.e. via one of the permitted AIS channels. The AIS data 5 are furthermore fed to a redundancy data generator 11 of the AIS transmitter 1. Coded data formed with an error-correcting code and comprising, in particular, the redundancy data are generated there from the AIS data 5. A total of n+k coded data bits can thus be generated e.g. in the sense of a systematic coding from n bits of the AIS data 5. The added k data bits are further transmitted herefrom as redundancy data. These redundancy data are fed by the redundancy data generator 11 to a redundancy signal transmitter 12 which converts the redundancy data into transmittable redundancy signals, e.g. through corresponding modulation. These redundancy signals are then transmitted by the redundancy signal transmitter 12 via an auxiliary channel 42 present in addition to the main channel 41. The transmission of the AIS signals via the main channel 41 and the transmission of the redundancy signals via the auxiliary channel 42 can be carried out via the same antenna of the AIS transmitter 1 or via separate antennas.

The AIS signals transmitted by the AIS transmitter 1 via the transmission path 4 and the redundancy signals can essentially be received by any AIS transmitter within radio range. However, a reception, including an evaluation of the redundancy signals, can only be carried out by means of correspondingly equipped AIS receivers corresponding to the AIS receiver 2 shown here. The AIS receiver 3 designed according to the previous standard can evaluate the AIS signals of the AIS transmitter 1 transmitted via the transmission path 4 via the main channel 41 without problems as before, i.e. it can convert the AIS signals from the main channel 41 via its AIS signal converter 30 into received AIS data 7 and output them to other devices.

The redundancy signals transmitted via the auxiliary channel 42 may in fact also physically arrive at the AIS receiver 3 or its antenna, but do not result in any further evaluation, as indicated in FIG. 4 by the arrow 40 shown merely by dotted lines.

The AIS signals from the main channel 41 are similarly received in the AIS receiver 2 and are converted via an AIS signal converter 20 into received AIS data which match the AIS data 5 except for possible transmission errors. The redundancy signals from the auxiliary channel 42 are additionally received in the AIS receiver 2 and are converted via a redundancy signal receiver 21 of the AIS receiver 2 into the redundancy data. These redundancy data are fed to an error correction unit 22 to which the received AIS data output by the AIS signal converter 20 are also fed. An error correction of the received AIS data or parts thereof is carried out as far as possible by the error correction unit 22. The correspondingly error-corrected AIS data are then output by the error correction unit 22 as received AIS data 6.

As explained above, the invention also comprises implementation possibilities in which the auxiliary channel is coupled to the main channel in such a way that the transmission paths for the main channel 41 and the auxiliary channel 42 shown separately FIG. 1 are combined in the representation. This is explained using the example shown in FIG. 2. In the embodiment according to FIG. 2, the auxiliary channel is implemented, for example, through amplitude modulation of the AIS signals transmitted by the AIS transmitter 1.

The AIS transmitter 1 is in turn designed accordingly in FIG. 2 with the AIS signal converter 10 and the redundancy data generator 11. In contrast to the embodiment shown in FIG. 1, the AIS signals output by the AIS signal converter 10 are modulated on the transmitter side, i.e. in the AIS transmitter 1, in a modulator 13 with the redundancy signals from the redundancy data generator 11, e.g. according to the aforementioned amplitude modulation. The AIS signals to be transmitted which are obtained in this way still adhere to the limit values specified by the AIS standard, wherein the main channel 41 and the auxiliary channel 42 are formed within the same signal transmission. These AIS signals are transmitted in turn via the transmission path 4 to the AIS receiver 2 and to the AIS receiver 3.

As already explained with reference to FIG. 1, the AIS receiver 3 is not configured to evaluate the redundancy signals. It receives the AIS signals transmitted via the transmission path 4, but can only evaluate the signal components of the main channel 41 and converts these into the received AIS data 7.

The redundancy signals which are contained in the signal transmitted via the transmission path 4 are evaluated in the AIS receiver 2. The signals received via the transmission path 4 are fed in the AIS receiver to the AIS signal converter 20 and, in this case, additionally to the redundancy signal receiver 21. In this case, the redundancy signal receiver 21 is designed as technically different compared with the embodiment shown in FIG. 1, since it must filter out or demodulate the redundancy signal component from the common signal in the embodiment shown in FIG. 2.

As in the embodiment shown in FIG. 1, the received AIS data output by the AIS signal converter 20 and the redundancy data obtained from the redundancy signal receiver 21 are fed to the error correction unit 22 by which the explained error correction is carried out.

The data output herefrom are finally output as received AIS data 6.

The invention claimed is:

1. A method for Automatic Identification System (AIS) data transmission by means of AIS-standard-compliant AIS signals, comprising the steps of:
converting on a transmitter side AIS data to be transmitted into AIS signals and transmitting the AIS signals via a main channel;
receiving on a receiver side the AIS signals in an AIS receiver and converting the received AIS signals into received AIS data; and
generating on the transmitter side redundancy signals from the AIS data or parts thereof and transmitting the redundancy signals via at least an auxiliary channel to the AIS receiver, wherein the redundancy signals are convertible to error-correcting redundancy data usable on the receiver side to correct errors of the received AIS data.

2. The method as claimed in claim 1, wherein either
only the AIS signals from the main channel are evaluated on the receiver side in order to form the received AIS data, or
the AIS signals from the main channel are evaluated together with evaluation of received redundancy signals to at least partially correct transmission errors present in the received AIS data.

3. The method as claimed in claim 1 wherein the error-correcting redundancy data are generated through coding by a systematic code which allows an error correction of the data.

4. The method as claimed in claim 1 wherein either
the AIS signals transmitted via the main channel are not affected by the transmission of the redundancy signals on the auxiliary channel, or
are affected only insofar as AIS receivers not configured to evaluate the redundancy signals can convert the AIS signals into the received AIS data.

5. The method as claimed in claim 1 wherein the redundancy data allow at least an error correction of the "vessel identification" and "vessel position" AIS data.

6. An AIS transmitter which is configured to carry out the transmitter-side method steps of claim 1, said AIS transmitter being configured to
convert AIS data to be transmitted into AIS signals,
transmit the AIS signals via a main channel to an AIS receiver, and
generate redundancy signals from the AIS data or parts thereof and
transmit the redundancy signals via at least an auxiliary channel to the AIS receiver, wherein the redundancy signals are convertible error-correcting redundancy data usable on by the AIS receiver side to correct errors of the received AIS data.

7. The AIS transmitter as claimed in claim 6, further comprising:
  a redundancy data generator which is configured to generate the redundancy data from AIS data or from parts thereof that are fed to it; and
  a redundancy signal transmitter which is configured to convert the redundancy data into the redundancy signals and to transmit the redundancy signals via the auxiliary channel, wherein the redundancy signal transmitter is connected downstream of the redundancy generator.

8. An AIS receiver which is configured to carry out the receiver-side method steps of claim 1, said AIS receiver being configured to
  receive on the receiver side the AIS signals,
  convert the received AIS signals into received AIS data, and
  use redundancy signals received via at least an auxiliary channel that are generated on the transmitter side from the AIS data or parts thereof, wherein the redundancy signals are convertible to error-correcting redundancy data for correcting errors of the received AIS data.

9. The AIS receiver as claimed in claim 8, further comprising:
  a redundancy signal receiver configured to receive the redundancy signals and to convert these redundancy signals into the error-correcting redundancy data, and
  an error correction unit configured to carry out an error correction of the received AIS data or parts thereof using the redundancy data, wherein the error correction unit is connected downstream of the redundancy signal receiver.

10. An AIS transceiver, comprising:
an AIS transmitter as claimed in claim 6; and
an AIS receiver configured to
  receive on the receiver side the AIS signals,
  convert the received AIS signals into received AIS data, and
  use redundancy signals received via at least an auxiliary channel that are generated on the transmitter side from the AIS data or parts thereof, wherein the redundancy signals are convertible to error-correcting redundancy data for correcting errors of the received AIS data.

11. A system of AIS transmitters and AIS receivers, comprising:
  a) at least one AIS transmitter as claimed in claim 6,
  b) at least one AIS receiver configured to
    receive on the receiver side the AIS signals,
    convert the received AIS signals into received AIS data, and
    use redundancy signals received via at least an auxiliary channel that are generated on the transmitter side from the AIS data or parts thereof, wherein the redundancy signals are convertible to error-correcting redundancy data for correcting errors of the received AIS data,
  c) at least one AIS receiver which is not configured to evaluate the redundancy signals,
  wherein the AIS data transmitted by the at least one AIS transmitters can be received and evaluated not only by the at least one AIS receivers according to feature b), but also by the at least one AIS receiver according to feature c).

12. A computer program with program code encoded in a non-transitory storage media, configured to carry out the transmitter-side method steps and/or the receiver-side method steps of the method as claimed in claim 1 when the computer program is executed on a computer.

* * * * *